United States Patent
Renner et al.

(10) Patent No.: US 9,914,287 B2
(45) Date of Patent: Mar. 13, 2018

(54) ADHESION PROMOTER FOR ADHESIVE COMPOSITES COMPOSED OF PLASTIC AND OF A POLYISOCYANATE POLYADDITION PRODUCT

(75) Inventors: Christian Renner, Lemfoerde (DE); Gerlinde Tischer, Ruhland (DE); Rolf Illguth, Diepholz (DE); Margit Gehring, Lemfoerde (DE); Franz Xaver Redl, Shanghai (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/140,161

(22) PCT Filed: Dec. 10, 2009

(86) PCT No.: PCT/EP2009/066783
§ 371 (c)(1),
(2), (4) Date: Jun. 16, 2011

(87) PCT Pub. No.: WO2010/072572
PCT Pub. Date: Jul. 1, 2010

(65) Prior Publication Data
US 2011/0250429 A1 Oct. 13, 2011

(30) Foreign Application Priority Data
Dec. 23, 2008 (EP) .................... 08172710

(51) Int. Cl.
| | | |
|---|---|---|
| B32B 27/40 | (2006.01) | |
| B32B 37/14 | (2006.01) | |
| C08G 18/40 | (2006.01) | |
| C08G 18/42 | (2006.01) | |
| B32B 5/18 | (2006.01) | |
| B32B 7/12 | (2006.01) | |
| B32B 27/06 | (2006.01) | |
| B32B 27/08 | (2006.01) | |
| B32B 27/18 | (2006.01) | |
| C08G 101/00 | (2006.01) | |

(52) U.S. Cl.
CPC ............... *B32B 27/40* (2013.01); *B32B 5/18* (2013.01); *B32B 7/12* (2013.01); *B32B 27/065* (2013.01); *B32B 27/08* (2013.01); *B32B 27/18* (2013.01); *B32B 37/14* (2013.01); *C08G 18/4018* (2013.01); *C08G 18/4216* (2013.01); *B32B 2266/0278* (2013.01); *B32B 2307/206* (2013.01); *B32B 2307/7265* (2013.01); *B32B 2307/734* (2013.01); *B32B 2419/00* (2013.01); *B32B 2605/08* (2013.01); *B32B 2605/18* (2013.01); *C08G 2101/0058* (2013.01); *C08G 2101/0083* (2013.01); *Y10T 428/249953* (2015.04)

(58) Field of Classification Search
None
See application file for complete search history.

(56) References Cited

U.S. PATENT DOCUMENTS

| | | | | |
|---|---|---|---|---|
| 5,403,615 A | * | 4/1995 | Winkler et al. | 427/117 |
| 6,284,836 B1 | * | 9/2001 | Hassel et al. | 524/591 |
| 6,465,104 B1 | * | 10/2002 | Krebs et al. | 428/423.1 |
| 2003/0176618 A1 | * | 9/2003 | Kreyenschmidt et al. | 528/48 |
| 2006/0057395 A1 | * | 3/2006 | Haas et al. | 428/423.1 |
| 2007/0173628 A1 | | 7/2007 | Ruppel et al. | |

FOREIGN PATENT DOCUMENTS

| | | | | |
|---|---|---|---|---|
| DE | 100 22 276 | | 11/2001 | |
| DE | 100 22 280 | | 11/2001 | |
| DE | 10022280 A1 | * | 11/2001 | ............... C08J 7/16 |
| EP | 0 090 444 | | 10/1983 | |
| EP | 1 361 239 | | 11/2003 | |
| EP | 1361239 A1 | * | 11/2003 | |
| JP | 11060674 A | * | 3/1999 | |
| WO | 2005 090440 | | 9/2005 | |
| WO | 2006 034800 | | 4/2006 | |

OTHER PUBLICATIONS

Pohl et al., Composite Material Useful for Making Automobile Interior Parts, Nov. 15, 2001, machine translation of DE10022280.*
Hayashi et al., Preparation of Thermoplastic Polyurethane Resin, Mar. 2, 1999, machine translation of JP11-060674.*
Partusch et al., Process for the Preparation of Polyurethane Semi-rigid Foams, Nov. 12, 2003, machine translation of EP1361239.*
International Search Report dated Jun. 24, 2010 in PCT/EP09/066783 filed Dec. 10, 2009.
Office Action dated May 9, 2017 in Indian Patent Application No. 5275/CHENP/2011.
Office Action dated May 18, 2017 in Canadian Application No. 2,936,765.

* cited by examiner

*Primary Examiner* — Chinessa T Golden
(74) *Attorney, Agent, or Firm* — Oblon, McClelland, Maier & Neustadt, L.L.P.

(57) ABSTRACT

The present invention relates to composite elements comprising (i) plastic, adhering to which there is (ii) a polyisocyanate polyaddition product, where the polyisocyanate polyaddition product is obtained via mixing of (a) isocyanate with (b) compounds having groups reactive toward isocyanates, (c) catalysts and optionally additional products to give a reaction mixture and converting the reaction mixture to a polyisocyanate polyaddition product, where the compounds (b) comprise a polyester polyalcohol as adhesion promoter, capable of production via polycondensation of an acid component and one or more low-molecular-weight diols whose molar mass is less than 500 g/mol, in excess, where the acid component comprises from 83 to 97 mol % of adipic acid and from 3 to 17 mol % of phthalic acid, isophthalic acid, and/or terephthalic acid. The present invention also relates to components in the fitting-out or aircraft, of vehicles, or of buildings, and to insulation comprising this type of composite element.

26 Claims, No Drawings

ADHESION PROMOTER FOR ADHESIVE COMPOSITES COMPOSED OF PLASTIC AND OF A POLYISOCYANATE POLYADDITION PRODUCT

TECHNICAL FIELD

The present invention relates to composite elements comprising (i) plastic, adhering to which there is (ii) a polyisocyanate polyaddition product, where the polyisocyanate polyaddition product is obtained via mixing of (a) isocyanate with (b) compounds having groups reactive toward isocyanates, (c) catalysts, (d) if appropriate, blowing agent, and (e) if appropriate, further additives, to give a reaction mixture and permitting the reaction mixture to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, in excess, where the acid component comprises from 83 to 97 mol % of adipic acid and from 3 to 17 mol % of phthalic acid, isophthalic acid, and/or terephthalic acid. The present invention further relates to composite elements comprising (i) plastic, adhering to which there is (ii) a polyisocyanate polyaddition product, where the polyisocyanate polyaddition product is obtained via mixing of (a) isocyanate with (b) compounds having groups reactive toward isocyanates, (c) catalysts, (d) if appropriate, blowing agent, and (e) if appropriate, further additives to give a reaction mixture and permitting the reaction mixture to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, in excess, where the low-molecular-weight diols comprise at least 5 to 66 mol % of 1,3-propanediol, based on the total amount of the diol. The present invention also relates to a process for the production of these composite elements, and to components in the fitting-out of aircraft, of vehicles, or of buildings, and also to cable sheathing and other electronic components, e.g. in the construction of vehicles or in household equipment, comprising this type of composite element.

BACKGROUND AND PRIOR ART

Further embodiments of the present invention can be found in the claims, in the description, and in the examples. The abovementioned features of the subject matter according to the invention, and the features thereof that will be explained below, can, of course, be used not only in the respective combination stated but also in other combinations, without exceeding the scope of the invention.

There are well-known polyisocyanate polyaddition products which are obtained by mixing (a) isocyanate with (b) compounds having groups reactive toward isocyanates, (c) catalysts, (d) if appropriate, blowing agent, and (e) if appropriate, further additives to give a reaction mixture and permitting the reaction mixture to complete its reaction to give the polyisocyanate polyaddition product, and there are also well-known composite elements involving said polyisocyanate polyaddition products with plastic. Mechanical stressing of said composite elements, if appropriate after exposure to a high temperature and humidity, frequently leads to undesired break-away of the plastics from the polyisocyanate polyaddition products. Break-away of the polyisocyanate polyaddition products from the other plastics, with resultant irreparable damage to the composite element, is not acceptable in particular for the use of such composite elements in automobile construction, where this type of stressing of these elements cannot be excluded.

In the sheathing of electrical conductors, the insulated conductors are sheathed by a second plastic, e.g. polyurethane. Said second plastic here has to adhere on the insulation, so as to ensure that the system is watertight longitudinally with respect to the arrangement of the electrical conductors. If the system here is not watertight, it is impossible, in particular in automobile construction, to ensure separation between a dry compartment and a wet compartment. If an electrical line is involved which leads to control-module boxes or fuse boxes, or if encapsulation of relays and plugs is involved, there is also the risk of electrical short circuits. Sheathing moreover provides mechanical protection of the individual contact parts to prevent damage to and depoling of these.

In order to improve the adhesion between polyisocyanate polyaddition product and plastic, adhesion promoters based on polyester polyalcohols are added to the reaction mixture. Components (b) to (e) are usually premixed in the form of polyol component for the production of composite elements. The actual production of the polyisocyanate polyaddition products then takes place via mixing of the polyol component with an isocyanate component which comprises isocyanates (a). This procedure simplifies the production of the polyisocyanate polyaddition product, since there are then only 2 components to be handled. Composite elements of this type are described by way of example in EP 1361239.

A disadvantage of the polyol component described in EP 1361239 is that this forms a metastable system at room temperature. If said polyol component is cooled to below about 14-18° C., a precipitate forms, and even if the polyol component is reheated to 25° C. it does not regain its homogeneity. However, if inhomogeneous polyol mixtures are used for the production of the polyisocyanate polyaddition product, the result is low-quality products which then in some cases do not have any adhesion at all to the plastic of the composite.

DE 100 22 276 and DE 100 22 280 disclose composite elements where the adhesion promoter is reacted together with isocyanate to give a prepolymer having hydroxy groups or, respectively, isocyanate groups, and this prepolymer is then added to the polyol component or, respectively, the isocyanate component. A disadvantage here is that a further operation is necessary in the production of the polyol component or, respectively, the isocyanate component. Furthermore, crystallization also takes place in the case of prepolymers comprising hydroxy groups and in the case of prepolymers comprising isocyanate, and the stability and homogeneity of the components and of the system are then at risk.

SUMMARY OF THE INVENTION

It was therefore an object of the present invention to provide a composite element which is composed of polyisocyanate polyaddition products and plastic and which is easy to produce, and which has good adhesion between the polyisocyanate polyaddition products and plastic. A particular object of the invention was to provide composite elements whose excellent mechanical properties permit, for example, their use in automobile construction, and whose adhesion between the plastic and the polyisocyanate polyaddition products adherent thereto is not lost even when they are stored for 80 hours at 80° C. and 80% rel. humidity.

A further object of the invention was to provide composite materials which can be used in the sector for insulation of electrical conductors and which have adequate adhesion to the insulation of the conductors prior to and after three periods of storage, each of 5 hours, at 120° C. and 100% relative humidity, and which are watertight parallel to the direction of running of the electrical conductors even after said heat-aging.

For the purposes of the present invention, a particular intention was that the composite elements be capable of production using starting components which give stable mixtures and which are therefore easy to be used, and which can be used reproducibly. A particular intention here was that, in the polyol component, compounds reactive toward isocyanates do not flocculate, even at temperatures below 15° C. Another object of the invention was to provide a process which can produce composite elements of this type and which is easy to carry out.

The object according to the invention is achieved via composite elements comprising (i) plastic, adhering to which there is (ii) a polyisocyanate polyaddition product, where the polyisocyanate polyaddition product is obtained via mixing of (a) isocyanate with (b) compounds having groups reactive toward isocyanates, (c) catalysts, (d) if appropriate, blowing agent, and (e) if appropriate, further additives, to give a reaction mixture and permitting the reaction mixture to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, where the acid component comprises from 83 to 97 mol % of adipic acid and from 3 to 17 mol % of phthalic acid, isophthalic acid, and/or terephthalic acid.

The object according to the invention is further achieved via composite elements comprising (i) plastic, adhering to which there is (ii) a polyisocyanate polyaddition product, where the polyisocyanate polyaddition product is obtained via mixing of (a) isocyanate with (b) compounds having groups reactive toward isocyanates, (c) catalysts, (d) if appropriate, blowing agent, and (e) if appropriate, further additives, to give a reaction mixture and permitting the reaction mixture to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, in excess, where the low-molecular-weight diols comprise from 5 to 66 mol % of 1,3-propanediol, based on the total amount of the diol.

The object according to the invention is further achieved via a process for the production of composite elements comprising (i) plastic, adhering to which there is (ii) a polyisocyanate polyaddition product, where (a) isocyanate is mixed with (b) compounds having groups reactive toward isocyanates, (c) catalysts, (d) if appropriate, blowing agent, and (e) if appropriate, further additives to give a reaction mixture and the reaction mixture is permitted to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, in excess, where the acid component comprises from 83 to 97 mol % of adipic acid and from 3 to 17 mol % of phthalic acid, isophthalic acid, and/or terephthalic acid.

The object according to the invention is likewise achieved via a process for the production of composite elements comprising (i) plastic, adhering to which there is (ii) a polyisocyanate polyaddition product, where (a) isocyanate is mixed with (b) compounds having groups reactive toward isocyanates, (c) catalysts, (d) if appropriate, blowing agent, and (e) if appropriate, further additives to give a reaction mixture and the reaction mixture is permitted to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, in excess, where the low-molecular-weight diols comprise from 5 to 66 mol % of 1,3-propanediol, based on the total amount of the diol.

DETAILED DESCRIPTION OF THE INVENTION

For the purposes of the invention, polyisocyanate polyaddition products (ii) comprise in particular compact polyisocyanate polyaddition products, such as thermosets or thermoplastic polyurethanes, and foams based on polyisocyanate polyaddition products, examples being flexible foams, semirigid foams, or integral foams. For the purposes of the invention, polymer blends comprising polyurethanes and further polymers, and also foams composed of said polymer blends, are to be understood as polyisocyanate polyaddition products. The expressions "polyisocyanate polyaddition product" and "polyurethane" are used as synonyms for the purposes of the present invention.

For the purposes of the invention, a compact polyurethane is intended to mean a solid which is in essence free from gas inclusions. Further details concerning compact polyisocyanate polyaddition products according to the invention are found in "Kunststoffhandbuch, Band 7, Polyurethane [Plastics Handbook, volume 7, Polyurethanes]", Carl Hanser Verlag, 3rd edition 1993, chapter 8. Thermoplastic polyurethanes are compact polyurethanes which exhibit thermoplastic properties. Thermoplastic properties here are understood to consist in repeated capability of the thermoplastic polyurethane to melt on heating, with plastic flow. Further details concerning thermoplastic polyurethanes according to the invention are found in "Kunststoffhandbuch, Band 7, Polyurethane [Plastics Handbook, volume 7, Polyurethanes]", Carl Hanser Verlag, 3rd edition 1993, chapter 8.2.

For the purposes of the invention, polyurethane foams are foams according to DIN 7726. The compressive stress at 10% compression, or, respectively, compressive strength to DIN 53 421/DIN EN ISO 604 of flexible polyurethane foams according to the invention here is 15 kPa or less, preferably from 1 to 14 kPa, and in particular from 4 to 14 kPa. The compressive stress at 10% compression of semirigid polyurethane foams according to the invention to DIN 53 421/DIN EN ISO 604 is from greater than 15 to less than 80 kPa. The open-cell factor of semirigid polyurethane foams and flexible polyurethane foams according to the invention to DIN ISO 4590 is preferably greater than 85%, particularly preferably greater than 90%. Further details concerning flexible polyurethane foams and semirigid polyurethane foams according to the invention are found in "Kunststoffhandbuch, Band 7, Polyurethane [Plastics Handbook, volume 7, Polyurethanes]", Carl Hanser Verlag, 3rd edition 1993, chapter 5.

Integral polyurethane foams are polyurethane foams to DIN 7726 with a marginal zone whose density is higher than that of the core as a result of the shaping process. The total envelope density averaged over the core and the marginal zone is preferably above 100 g/l here. For the purposes of the invention, integral polyurethane foams can be rigid polyurethane foams, semirigid polyurethane foams, or flexible polyurethane foams. Further details concerning integral polyurethane foams according to the invention are found in "Kunststoffhandbuch, Band 7, Polyurethane [Plastics Handbook, volume 7, Polyurethanes]", Carl Hanser Verlag, 3rd edition 1993, chapter 7.

The composite elements according to the invention can comprise, as plastic (i), by way of example thermoset plastic or thermoplastic. It is preferable to use thermoplastic. Conventional thermoplastics comprise by way of example polyphenylene oxide (PPO), polyvinyl chloride (PVC), acrylonitrile-butadiene styrene (ABS), polymethyl methacrylate (PMMA), acrylonitrile-styrene-acrylate (ASA), polycarbonate (PC), thermoplastic polyurethane (TPU), polyethylene (PE), polypropylene (PP). The composite elements preferably comprise, as plastic (i), thermoplastic polyolefins (TPO), such as polyethylene and/or polypropylene, polyvinyl chloride (PVC), styrene-maleic anhydride (SMA), and/or a polycarbonate/styrene-acrylonitrile/acrylonitrile-butadiene blend (PC/ABS), preferably in the form of foils or sheets, or in the form of braided material.

The plastics (i) can be used in the form of conventional materials for the production of the composite elements, for example in the form of sheets or foils, generally with a thickness of from 0.2 to 2 mm.

Foils of this type are commercially available, and their production is well-known. The thickness of the foils is preferably from 0.2 to 2 mm. It is also possible to use, as (i), foils comprising at least two layers, where, for example, one of the layers comprises an ASA and/or polycarbonate material.

Plastics (i) moreover comprise all of the conventional plastics-based materials which are usually used for the insulation of electrical conductors. These comprise polyvinyl chlorides (PVC), thermoplastic polyurethane (TPU), polypropylene (PP), and ethylene-tetrafluoroethylene (ETFE).

The plastics (i) composed of styrene-maleic anhydride (SMA) and/or a polycarbonate/styrene-acrylonitrile/acrylonitrile-butadiene blend (PC/ABS) can be used in the form of conventional materials for the production of the composite elements, for example in the form of stiffening part for instrument panels or door-side parts. Skin materials for the same application are often composed of thermoplastic polyolefins (TPOs) and polyvinyl chloride (PVC).

According to the invention, the polyisocyanate polyaddition products (ii) adhere to the plastic (i). The production of said polyisocyanate polyaddition products (ii), preferably of the polyurethanes, takes place according to the invention via mixing of (a) isocyanate with (b) compounds having groups reactive toward isocyanates, (c) catalysts, (d) if appropriate, blowing agent, and (e) if appropriate, further additives, to give a reaction mixture and permitting the reaction mixture to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, in excess, where the acid component comprises from 83 to 97 mol % of adipic acid and from 3 to 17 mol % of phthalic acid, isophthalic acid, and/or terephthalic acid.

In another embodiment of the present invention, the production of said polyisocyanate polyaddition products (ii), preferably of the polyurethanes, takes place via mixing of (a) isocyanate with (b) compounds having groups reactive toward isocyanates, (c) catalysts, (d) if appropriate, blowing agent, and (e) if appropriate, further additives to give a reaction mixture and permitting the reaction mixture to complete its reaction to give the polyisocyanate polyaddition product, where the compounds (b) having groups reactive toward isocyanates comprise a polyester polyalcohol as adhesion promoter, capable of production via polycondensation of an acid component and of one or more low-molecular-weight diols whose molar mass is less than 500 g/mol, in excess, where the low-molecular-weight diols comprise from 5 to 66 mol % of 1,3-propanediol, based on the total amount of the diol.

For the purposes of the invention, the mixture of components (a) to (c), and also, if present, (d) and (e) is termed reaction mixture when conversions in the reaction are smaller than 90%, preferably smaller than 80%, based on the isocyanate groups.

The isocyanate (a) used for the production of the composite materials according to the invention comprises any of the polyisocyanates known for the production of polyurethanes. These comprise the aliphatic, cycloaliphatic, and aromatic di- or polyfunctionalized isocyanates known from the prior art, and also any desired mixtures thereof. Examples are diphenylmethane 2,2'-, 2,4'-, and 4,4'-diisocyanate, the mixtures composed of monomeric diphenylmethane diisocyanates and of homologs of diphenylmethane diisocyanate having a larger number of rings (polymer MDI), isophorone diisocyanate (IPDI) or its oligomers, tolylene 2,4- or 2,6-diisocyanate (TDI), or a mixture of these, tetramethylene diisocyanate or its oligomers, hexamethylene diisocyanate (HDI) or its oligomers, or naphthylene diisocyanate (NDI), or a mixture thereof.

It is preferable to use 4,4'-MDI and/or HDI, or else homologs of diphenylmethane diisocyanate (PMDI) having a higher number of rings. 4,4'-MDI is particularly preferably used in mixtures with PMDI and can comprise small amounts, up to about 10% by weight, of uretdione-, allophanate-, or uretonimine-modified polyisocyanates. Other possible isocyanates are described by way of example in "Kunststoffhandbuch, Band 7, Polyurethane [Plastics Handbook, volume 7, Polyurethanes]", Carl Hanser Verlag, 3rd edition 1993, chapter 3.2 and 3.3.2.

The isocyanate (a) can be used in the form of polyisocyanate prepolymers. Said polyisocyanate prepolymers are obtainable by reacting an excess of polyisocyanates described above (constituent (a-1)), with polyols (constituent (a-2)) for example at temperatures of from 30 to 100° C., preferably at about 80° C., to give the prepolymer.

Polyols (a-2) are known to the person skilled in the art and are described by way of example in "Kunststoffhandbuch, 7, Polyurethane [Plastics Handbook, 7, Polyurethanes]", Carl Hanser Verlag, 3rd edition 1993, chapter 3.1. By way of example, therefore, it is also possible that the polyols used also comprise the polyols described below under (b).

If appropriate, it is also possible to add chain extenders or crosslinking agents (a-3) to the reaction to give the polyisocyanate prepolymer. Suitable chain extenders for the prepolymer are dihydric alcohols, and suitable crosslinking agents for the prepolymer are trihydric alcohols, examples being dipropylene glycol and/or tripropylene glycol, or the adducts of dipropylene glycol and/or tripropylene glycol with alkylene oxides, preferably propylene oxide.

Compounds used having groups reactive toward isocyanates can comprise any of the compounds which have at least two hydrogen atoms reactive toward isocyanate. By way of example, it is possible to use compounds of this type whose functionality is from 2 to 8 and whose molar mass is from 500 to 12 000 g/mol, preferably from 1000 to 6000 g/mol. By way of example, therefore, it is possible to use polyether polyamines, polycarbonatediols and/or polyether polyols, polyester polyalcohol polyols, or a mixture thereof.

Polyetherols are by way of example produced from epoxides, such as propylene oxide and/or ethylene oxide, or from tetrahydrofuran, using starter compounds having active hydrogen atoms, examples being aliphatic alcohols, phenols, amines, carboxylic acids, water, or compounds based on natural substances, e.g. sucrose, sorbitol, or mannitol, with use of a catalyst. Mention may be made here of basic catalysts or of double-metal-cyanide catalysts, for example as described in PCT/EP2005/010124, EP 90444 or WO 05/090440.

Polyester polyalcohol polyols are by way of example produced from alkanepolycarboxylic acids, preferably alkanedicarboxylic acids, and an excess of alcohol and polyhydric alcohols, polythioether polyols, polyesteramides, polyacetals containing hydroxy groups, and/or aliphatic polycarbonates containing hydroxy groups, preferably in the presence of an esterification catalyst. Other possible polyols are given by way of example in "Kunststoffhandbuch, Band 7, Polyurethane [Plastics Handbook, volume 7, Polyurethanes]", Carl Hanser Verlag, 3rd edition 1993, chapter 3.1.

It is preferable that the polyether alcohols (b) used, in particular in the production of flexible foams and of semirigid foams, comprise polyether alcohols whose average functionality is from 2 to 3 and whose OH number is from 20 to 50 mg KOH/g, and also that the adhesion promoters used comprise the preferred amounts described in the introduction of the polyester polyalcohol alcohols according to the invention and described in the introduction. Polyetherols and their preparation, for example via alkoxylation of conventional starter substances, are well known.

For flexible integral systems or compact systems, where either of these is used for cable sheathing or for encapsulation of plugs, it is preferable to use mixtures composed of polyether alcohols whose average functionality is from 1.5 to 2.5 and whose OH number is from 20 to 50 mg KOH/g with polyether alcohols whose average functionality is from 2 to 3 and whose OH number is from 20 to 50 mg KOH/g, and also with chain extenders. It is also possible to use graft polyols.

The compounds (b) according to the invention can moreover be used in a mixture with chain extenders and/or with crosslinking agents, as compounds reactive toward isocyanates. The chain extenders are usually dihydric alcohols whose molar masses are from 60 g/mol to 499 g/mol, examples being ethylene glycol, propylene glycol, 1,4-butanediol, or 1,5-pentanediol. The crosslinking agents are usually compounds whose molar masses are from 60 g/mol to 499 g/mol and which have 3 or more active hydrogen atoms, preference being given here to amines and particular preference being given here to alcohols, such as glycerol, trimethylolpropane, and/or pentaerythritol, and also alkoxylation products of these. It is preferable to use crosslinking agents whose functionality toward isocyanates is 3 and whose OH number is greater than 500 mg KOH/g, preferably greater than 900 mg KOH/g, particularly preferably greater than 1200 mg KOH/g.

The adhesion promoters used comprise polyester polyalcohols which can be produced via a polycondensation from an acid component and from one or more low-molecular-weight diols whose molar mass is less than 500 g/mol, in excess, where the acid component comprises from 83 to 97 mol % of adipic acid and from 3 to 17 mol %, preferably from 4 to 15 mol %, and particularly preferably from 8 to 12 mol %, of phthalic acid, isophthalic acid and/or terephthalic acid. It is preferable that the acid component for the production of the adhesion promoter comprises no further di- or polybasic carboxylic acids other than adipic acid and phthalic acid, isophthalic acid, and/or terephthalic acid. It is preferable that the acid component is composed of adipic acid and isophthalic acid. The low-molecular-weight diol used preferably comprises monoethylene glycol, 1,3-propanediol, 1,4-butanediol, 1,5-pentanediol, and/or 1,6-hexanediol.

In another embodiment of the invention, the adhesion promoter used comprises polyester polyalcohols which can be produced via polycondensation of an acid component and of one or more low-molecular-weight diols whose molar mass is less than 500 g/mol, in excess, where the low-molecular-weight diols comprise from 5 to 66 mol %, preferably from 10 to 50 mol %, of 1,3-propanediol, based on the total amount of the diol. It is preferable that the acid component here comprises at least 90% by weight, particularly preferably 95% by weight, and in particular 100% by weight, of adipic acid. The diols here preferably comprise at least one further diol alongside propanediol, selected from the group consisting of monoethylene glycol, 1,4-butanediol, 1,5-pentanediol, and 1,6-hexanediol.

The hydroxy number of the adhesion promoter is preferably from 40 to 100 mg KOH/g, preferably from 45 to 80 mg KOH/g, and particularly preferably from 50 to 65 mg KOH/g. The proportion of the adhesion promoter is from 0.1 to 15% by weight, preferably from 0.5 to 10% by weight, and particularly preferably from 0.8 to 5% by weight, based on the total weight of the compound (b) having groups reactive toward isocyanate. The adhesion promoters according to the invention are easy to process and have viscosities at 75° C. which are smaller than 2000 mPas, preferably smaller than 1500 mPas, and particularly preferably smaller than 1200 mPas.

Catalysts (c) that can be used comprise conventional compounds which by way of example markedly accelerate the reaction of component (a) with component (b). Examples of those that can be used are tertiary amines and/or organometallic compounds well known for this purpose. Mention may be made by way of example of amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethyl-butanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo-[2.2.2]octane, and alkanolamine compounds, such as triethanolamine, triisopropanolamine, N-methyl- and N-ethyldiethanolamine, and dimethylethanolamine. Equally, use may be made of organometallic compounds, preferably organotin compounds, examples being stannous salts of organic carboxylic acids, e.g. stannous acetate, stannous octoate, stannous ethylhexoate, and stannous laurate, and the dialkyltin (IV)

salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) is an ester, it is preferable to use exclusively amine catalysts.

Preferred catalysts used are those which give minimum fogging (DIN 75201), and also low VOC and fog values (VDA 278), i.e. minimum emission of volatile compounds from the foam. It is preferable to use, as catalysts (c), compounds which are reactive toward isocyanates, i.e. by way of example which have a free hydroxy group and/or a free amino group. Compounds of this type are well known and have been widely described. By way of example, dimethylaminopropylamine, N,N,N-trimethyl-N-hydroxyethylbis(aminoethyl)ether, aminopropylimidazole and/or 2-propanolbis(3-dimethylaminopropyl)amine can be used.

In particular the production of semirigid foams is preferably carried out in the absence of catalysts containing tin. The amount used of salts of carboxylic acids, for example potassium acetate, as catalysts (c) is preferably smaller than 0.21% by weight, particularly preferably smaller than 0.15% by weight, based on the total weight of the compounds (b) reactive toward isocyanates.

The blowing agents (d) used for the production of the foamed polyisocyanate polyaddition products according to the invention can comprise well-known compounds having chemical or physical action. A preferred blowing agent that can be used having chemical action is water, which forms carbon dioxide via reaction with the isocyanate groups. Examples of physical blowing agents, i.e. those inert compounds which vaporize under the conditions of polyurethane formation, are (cyclo)aliphatic hydrocarbons, preferably those having from 4 to 8, particularly preferably from 4 to 6 and in particular 5, carbon atoms, partially halogenated hydrocarbons, or ethers, ketones, or acetates. The amount of the blowing agents used depends on the desired density of the foams. The various blowing agents can be used individually or in any desired mixtures with one another.

As blowing agent (d) for semirigid foams it is preferable to use water, its amount preferably being from 1% by weight to 5% by weight, particularly preferably from 1.5 to 3% by weight, based on the total weight of the compounds (b) reactive toward isocyanates. In the case of flexible integral foams it is likewise preferable to use water, its amount preferably being from 0% by weight to 0.8% by weight, particularly preferably from 0.07 to 0.3% by weight, based on the total weight of the compounds reactive toward isocyanates. Physical blowing agents are also often used for flexible integral foams. In the event that a compact product is to be produced as polyisocyanate polyaddition product, no blowing agents are used.

The reaction takes place, if appropriate, in the presence of (e) additives, e.g. fillers, fibers, e.g. in the form of wovens and/or mats, cell regulators, surfactants, and/or stabilizers with respect to oxidative, thermal, or microbial degradation or aging. It is preferable that the production of the foams according to the invention takes place in the presence of well-known emulsifiers, which retain the phase-stability of the polyester polyalcohol according to the invention in the preferred polyetherol as component (b).

The production of the composite elements according to the invention takes place by bringing the reaction mixture for the production of the polyisocyanate polyaddition products (ii) into contact with the plastic (i), usually without the use of further materials generating adhesion, for example adhesives. It is preferable that plastic (i) and polyisocyanate polyaddition product (ii) are brought into contact with one another in the condition where reaction has not been completed. It is particularly preferable that, for the production of the composite elements according to the invention, the reaction mixture for the production of the composite elements according to the invention is brought into contact with the plastic (i), for example in a mold. In other respects, the production of the polyisocyanate polyaddition products which can, if appropriate, comprise isocyanurate structures and/or urea structures, for example of the flexible foams, semirigid foams, or integral foams, particularly preferably of the semirigid foams and integral foams, takes place by well-known processes, for example the one-shot process, using well-known tooling, molds, mixing apparatuses, and feed equipment.

For the production of the products according to the invention, the isocyanates (a) and the compounds (b) reactive toward isocyanates and, if appropriate, (d) can be reacted in amounts such that the equivalence ratio of NCO groups of (a) to the total number of the reactive hydrogen atoms of (b) and, if appropriate, (d) is preferably from 0.3 to 1.8:1, particularly preferably from 0.7 to 1.3:1, and in particular from 0.9 to 1.1:1. The reaction to give the product can by way of example be carried out via manual casting, or via high-pressure or low-pressure machinery, for example via RIM processes (reaction injection molding) in closed or preferably open molds. Suitable processing machinery is available commercially. The starting components are usually, as a function of the application, mixed at a temperature of from 0 to 100° C., preferably from 20 to 80° C., and by way of example introduced into the mold. The plastic (i) here is preferably inserted into the mold prior to the introduction of the reaction mixture. The mixing of components (a) to (e) can, as previously described, be carried out mechanically by means of a stirrer or a mixing screw, or can take place in a conventional high-pressure mixing head. By way of example, the reaction of the reaction mixture can take place in conventional, preferably temperature-controllable and sealable molds. The molds used for the production of the products can comprise conventional and commercially available tooling, the surface of which is composed by way of example of steel, aluminum, enamel, Teflon, epoxy resin, or another polymeric material, and the surface here can, if appropriate, have been chromed, for example hard-chromed. The molds should preferably be temperature-controllable, in order to permit setting of the preferred temperatures, sealable, and preferably equipped to exert a pressure on the product. The mold temperature at which the reaction to give the polyurethane foams usually takes place, and this is also the preferred temperature of the starting components, is from 20 to 220° C., preferably from 25 to 120° C., particularly preferably from 30 to 80° C., and the reaction time here is usually from 0.5 to 30 min, preferably from 1 to 5 min. It has proven advantageous to produce the polyurethane foams by the two-component process, and to combine the compounds (b) reactive toward isocyanates and, if appropriate, the catalysts (c), and, if appropriate, blowing agent (d), and/or additives (e) in the A component, and to use the isocyanates (a) and, if appropriate, catalysts, and/or blowing agents as B component.

By virtue of the use of the polyester polyalcohol polyols described in the introduction, the composite elements according to the invention in particular have markedly improved adhesion between plastic (i) and polyisocyanate polyaddition product (ii). This adhesion can be determined in various ways, for example via measurement of the force needed to peel the plastic. In the case of sheet-like adhesive composites, it is preferable that the peel force achieved between (i) and (ii), measured to DIN 53289 or 53530, in new condition, and also after storage in hot and humid conditions, is 2.5 N/cm or more. The adhesion can also be determined by using subjective assessment criteria. In the case of encapsulation of cables and in the case of bushings, the system is only watertight longitudinally if there is adhesion between (i) and (ii). This is checked by way of example to the internal specification of DELPHI (REI-WDP 1), the internal specification of Ford (WSS-M15P45-A: FLTM-BI 104-01), or the PSA Peugeot Citroen standard (B21 7050). A column of water is placed on one side of the bushing here; if there is any measurable moisture on the other side of the bushing, the specimen does not pass the test. Tests using elevated air pressure are moreover carried out in some cases to test whether cable sheathing is leakproof, the pressure drop being measured.

the encapsulation of plugs and of relays, the polyisocyanate polyaddition product is preferably in compact form.

According to the invention, flocculation or crystallization of the polyester polyalcohols from a mixture with compounds (b) reactive toward isocyanates can be successfully avoided by using the polyester polyalcohols according to the invention. If crystallization takes place, the intention is that the precipitate dissolves on reheating to room temperature. Furthermore, the viscosity of the mixture at low temperatures is markedly lowered when comparison is made with mixtures using conventional polyester polyalcohols, thus improving their processability. Examples are used below to illustrate the invention.

The table below shows a selection of the polyester polyols which were produced for the object according to the invention and were tested for temperature-change behavior, for adhesion and also, if appropriate, for stability in the polyol component.

|  | Polyester 1 | Polyester 2 | Reference polyester 3 | Reference polyester 4 | Polyester 5 | Polyester 6 |
| --- | --- | --- | --- | --- | --- | --- |
| Adipic acid | 0.45 mol % | 0.45 mol % | 0.45 mol % | 0.40 mol % | 0.45 mol % | 0.45 mol % |
| Phthalic acid | 0.05 mol % |  |  |  | 0.05 mol % |  |
| Isophthalic acid |  | 0.05 mol % |  |  |  | 0.05 mol % |
| Succinic acid |  |  | 0.05 mol % | 0.1 mol % |  |  |
| Monoethylene glycol | 0.23 mol % | 0.23 mol % | 0.24 mol % | 0.24 mol % |  |  |
| 1,4-Butanediol | 0.27 mol % | 0.27 mol % | 0.26 mol % | 0.26 mol % | 0.11 mol % | 0.11 mol % |
| 1,5-Pentanediol |  |  |  |  | 0.25 mol % | 0.25 mol % |
| 1,6-Hexanediol |  |  |  |  | 0.14 mol % | 0.14 mol % |

The composite elements according to the invention are preferably used as components in vehicle construction, aircraft construction, or the construction of buildings, for example in the form of dashboards, door cladding, parcel shelves, consoles, armrests, or door mirrors. The composite elements according to the invention are also used in the sheathing of electrical conductors. Here, mention may be made not only of the production of dimensionally stable foam-encapsulated cable sets but also of the production of bushings, and of the encapsulation of plugs and of relays. For products in vehicle construction, aircraft construction or the construction of buildings, and also in the insulation of electrical conductors, the polyisocyanate polyaddition product here preferably takes the form of a foamed product. In For comparison, products were produced on the basis of adipic acid alone, and esters thereof using propanediol:

|  | Reference polyester 7 | Reference polyester 8 | Polyester 9 | Polyester 10 | Polyester 11 |
| --- | --- | --- | --- | --- | --- |
| Adipic acid | 0.5 mol % | 0.5 mol % | 0.5 mol % | 0.5 mol % | 0.5 mol % |
| Monoethylene glycol | 0.25 mol % |  | 0.17 mol % | 0.29 mol % |  |
| 1,3-Propanediol |  |  | 0.16 mol % | 0.07 mol % | 0.33 mol % |
| 1,4-Butanediol | 0.25 mol % | 0.12 mol % | 0.17 mol % | 0.14 mol % | 0.17 mol % |
| 1,5-Pentanediol |  | 0.26 mol % |  |  |  |
| 1,6-Hexanediol |  | 0.12 mol % |  |  |  |

The functionality of all of the abovementioned esters is 2, and their OH numbers are from 50 to 65 mg KOH/g. The pour points or crystallization temperatures of the pure substances were first determined at cooling rates of 1° C./day:

|  | OH numbers [in mg KOH/g] | Pour point or crystallization temperature |
| --- | --- | --- |
| Polyester 1 | 56.6 | 10° C. |
| Polyester 2 | 53.2 | 8° C. |

| | OH numbers [in mg KOH/g] | Pour point or crystallization temperature |
|---|---|---|
| Reference polyester 3 | 61.8 | 13° C. |
| Reference polyester 4 | 58.7 | 9° C. |
| Polyester 5 | 55.2 | 8° C. |
| Polyester 6 | 55.8 | 9° C. |
| Reference polyester 7 | 55.0 | >25° C. |
| Reference polyester 8 | 56.0 | 17° C. |
| Polyester 9 | 58.9 | 3° C. |
| Polyester 10 | 56.9 | 5° C. |
| Polyester 11 | 58.1 | 12° C. |

The polyesters using 10 mol % of phthalic acid and isophthalic acid, based on the acid component, and also the esters using propanediol, specifically those having amounts of propanediol smaller than 50 mol %, based on the total amount of diol, exhibit a markedly reduced pour point or crystallization point. When 10 mol % of succinic acid is used, there is only a slight reduction in the pour point or crystallization point, and a larger reduction is obtained only on addition of larger amounts of succinic acid.

Adhesion to PC/ABS sheets was studied. For this, 2 different qualities of sheets were used: Sheet 1: glassfiber-reinforced PC/ABS Sheet 2: PC/ABS without glass fiber reinforcement Adhesion was assessed using a subjective test method. The polyurethane here was peeled from the PC/ABS sheets, and adhesion was evaluated on the basis of an evaluation scale of 1 to 5. Key:
5 adhesive fracture, no adhesion
4 cohesive fracture; skin can easily be removed from the PC/ABS sheet
3 cohesive fracture; skin can be removed from the PC/ABS sheet
2 cohesive fracture; skin can be removed with difficulty from the PC/ABS sheet
1 cohesive fracture; skin cannot be removed from the PC/ABS sheet Adhesion from 1-4 is generally sufficient for automobile applications.

Adhesion is evaluated here 10 minutes, 1 hour, and 24 hours after the production process, and also after aging in hot and humid conditions (80° C., 80 hours, 80% relative humidity).

Various systems are studied below, using the following starting materials:
Polyol A: Polyether polyol with OH number 28 mg KOH/g, PO/EO ratio by weight 86:14, average functionality 2.7
Polyol B: Polyether polyol with OH number 36 mg KOH/g, PO/EO ratio by weight 87:13, average functionality 2.6
Polyol C: Polyether polyol with OH number 250 mg KOH/g, only PO, average functionality 2.0
Polyol D: Polyether polyol with OH number 30 mg KOH/g. PO/EO ratio by weight 94:6, average functionality 2.2
Polyol E: Polyether polyol with OH number 535 mg KOH/g; only EO, average functionality 3.0
Polyol F: Polyether polyol with OH number 35 mg KOH/g, PO/EO ratio by weight 86:14, average functionality 2.7
Polyol G: Polyether polyol with OH number 26 mg KOH/g, PO/EO ratio by weight 79:21, average functionality 2.5
Polyol H: Polyether polyol with OH number 555 mg KOH/g, only PO, average functionality 3.0
Polyol I: Polyether polyol with OH number 29 mg KOH/g, PO/EO ratio by weight 81:19, average functionality 1.8
PP 50: Perstorp polyol with OH number 630 and functionality 4
Jeffcat ZR50: amine catalyst from Huntsman, reactive toward isocyanate
Jeffcat ZF10: amine catalyst from Huntsman, reactive toward isocyanate
Polycat 15: amine catalyst from Air Products, reactive toward isocyanate
Isocyanate A: base-level MDI with functionality 2.1 and NCO content 26
Isocyanate B: base-level MDI with functionality 2.1 and NCO content 25
PMDI: Polymer MDI with average functionality 2.7 and NCO content 31.2

The formulations for systems 1 and 2 are collated in the table below, where the quantitative data are based on parts by weight

| | System 1 | System 2 |
|---|---|---|
| Polyol component | | |
| Polyol A | 86.0 | 70.5 |
| Polyol B | | 22.0 |
| Polyol C | | 1.0 |
| Polyester | 3.0 | 2.5 |
| Triethanolamine | | 1.5 |
| PP 50 | 7.5 | |
| Water | 2.6 | 1.2 |
| Jeffcat ZR-50 | 0.9 | 0.8 |
| Emulsifier | | 0.5 |
| Iso component | | |
| Isocyanate A | 70 | 85 |
| PMDI | 30 | 15 |
| MR 100: | 64 | 37 |
| Free density [kg/m$^3$] | 52 | 94 |
| Density of molding [kg/m$^3$] | 100 | 155 |

MR 100 here means mixing ratio in parts by weight of isocyanate component relative to 100 parts of polyol component The results of the adhesion test are shown in the two tables below:

| PC/ABS sheet used | System | Specimen type | After 10 min. | After 1 h | After 24 h | After heat/ humidity aging | Total |
|---|---|---|---|---|---|---|---|
| Sheet 1 | System 1 | Without polyester | 4 | 3 | 3 | 5 | 15 |
| Sheet 2 | | | 3 | 3 | 2 | 4 | 12 |
| Sheet 1 | System 1 | Polyester 1 | 1 | 1 | 1 | 3 | 6 |
| Sheet 2 | | | 1 | 1 | 1 | 3 | 6 |
| Sheet 1 | System 1 | Polyester 2 | 2 | 1 | 1 | 2 | 6 |
| Sheet 2 | | | 1 | 1 | 1 | 2 | 5 |
| Sheet 1 | System 1 | Ref polyester 3 | 1 | 1 | 1 | 3 | 6 |
| Sheet 2 | | | 1 | 1 | 1 | 2 | 5 |

| PC/ABS sheet used | System | Specimen type | After 10 min. | After 1 h | After 24 h | After heat/humidity aging | Total |
|---|---|---|---|---|---|---|---|
| Sheet 1 | System 1 | Ref polyester 4 | 3 | 2 | 3 | 4 | 12 |
| Sheet 2 | | | 2 | 2 | 2 | 4 | 10 |
| Sheet 1 | System 1 | Polyester 5 | 2 | 1 | 1 | 3 | 7 |
| Sheet 2 | | | 2 | 1 | 1 | 3 | 7 |
| Sheet 1 | System 1 | Polyester 6 | 2 | 1 | 1 | 3 | 7 |
| Sheet 2 | | | 1 | 1 | 1 | 3 | 6 |
| Sheet 1 | System 1 | Ref polyester 7 | 2 | 1 | 1 | 3 | 7 |
| Sheet 2 | | | 2 | 2 | 1 | 3 | 8 |
| Sheet 1 | System 1 | Ref polyester 8 | 3 | 2 | 3 | 3 | 11 |
| Sheet 2 | | | 1 | 1 | 3 | 3 | 8 |
| Sheet 1 | System 1 | Polyester 9 | 1 | 1 | 1 | 3 | 6 |
| Sheet 2 | | | 1 | 1 | 1 | 3 | 6 |
| Sheet 1 | System 1 | Polyester 10 | 1 | 1 | 1 | 3 | 6 |
| Sheet 2 | | | 1 | 1 | 1 | 3 | 6 |
| Sheet 1 | System 1 | Polyester 11 | 1 | 1 | 1 | 3 | 6 |
| Sheet 2 | | | 1 | 1 | 1 | 3 | 6 |

| PC/ABS sheet used | System | Specimen type | After 10 min. | After 1 h | After 24 h | After heat/humidity aging | Total |
|---|---|---|---|---|---|---|---|
| Sheet 1 | System 2 | Without polyester | 4 | 4 | 4 | 5 | 17 |
| Sheet 2 | | | 4 | 4 | 4 | 4 | 16 |
| Sheet 1 | System 2 | Polyester 1 | 2 | 2 | 2 | 5 | 11 |
| Sheet 2 | | | 1 | 1 | 1 | 5 | 8 |
| Sheet 1 | System 2 | Polyester 2 | 2 | 2 | 2 | 5 | 11 |
| Sheet 2 | | | 2 | 2 | 2 | 4 | 10 |
| Sheet 1 | System 2 | Ref polyester 3 | 2 | 2 | 2 | 5 | 11 |
| Sheet 2 | | | 2 | 2 | 1 | 5 | 10 |
| Sheet 1 | System 2 | Ref polyester 4 | 3 | 3 | 3 | 5 | 14 |
| Sheet 2 | | | 3 | 3 | 2 | 5 | 13 |
| Sheet 1 | System 2 | Polyester 5 | 2 | 2 | 1 | 5 | 10 |
| Sheet 2 | | | 1 | 1 | 1 | 5 | 8 |
| Sheet 1 | System 2 | Polyester 6 | 2 | 1 | 1 | 5 | 9 |
| Sheet 2 | | | 2 | 1 | 1 | 4 | 8 |
| Sheet 1 | System 2 | Ref polyester 7 | 2 | 2 | 2 | 5 | 11 |
| Sheet 2 | | | 2 | 2 | 3 | 5 | 12 |
| Sheet 1 | System 2 | Ref polyester 8 | 1 | 1 | 2 | 5 | 9 |
| Sheet 2 | | | 2 | 2 | 1 | 4 | 9 |
| Sheet 1 | System 2 | Polyester 9 | 2 | 2 | 2 | 5 | 11 |
| Sheet 2 | | | 1 | 1 | 1 | 5 | 8 |
| Sheet 1 | System 2 | Polyester 10 | 1 | 1 | 1 | 5 | 8 |
| Sheet 2 | | | 1 | 1 | 1 | 5 | 8 |
| Sheet 1 | System 2 | Polyester 11 | 2 | 2 | 1 | 5 | 10 |
| Sheet 2 | | | 2 | 2 | 1 | 5 | 10 |

From the examples it can be seen that adhesion using the polyester polyols having 10% of phthalic acid and isophthalic acid, based on the acid component, and adhesion using the polyesterols having 1,3-propanediol as diol is at least similar to or better than adhesion using the reference polyols. Although esters having 10% of succinic acid, based on the A component, exhibit equally good adhesion, the desired resistance to temperature change is achieved only for relatively large amounts (20%, based on the acid component), and there is marked impairment of adhesion when such large amounts are used, and use of succinic acid is therefore not advisable. It is moreover apparent that relatively large amounts of an acid other than adipic acid reduce adhesion.

Clouding of the polyol component was studied by taking the following systems as an example, the quantitative data here being based on parts by weight:

| Polyol component | System 3 | System 4 |
|---|---|---|
| Polyol A | 77.3 | |
| Polyol B | | 45.5 |
| Polyol C | 1.5 | 2.0 |
| Polyol D | | 36.5 |
| Polyol E | | 4.0 |
| Polyol F | 0.3 | 2.7 |
| Polyol G | 10.0 | |
| Polyol H | 3.0 | |
| Polyester | 3.0 | 3.0 |
| Triethanolamine | 2.0 | 1.5 |
| Ricinoleic acid | | 1.6 |
| Water | 1.8 | 2.2 |
| Potassium acetate, 25% in EG | 0.6 | |
| Jeffcat ZF-10 | 0.2 | |
| Polycat 15 | | 0.5 |
| Emulsifier | 0.3 | 0.5 |

The various polyesters were used in systems 3 and 4 and cooled at a cooling rate of 1° C./day in a separating funnel. The observed results were as follows:

|  | System 3 | |
|---|---|---|
|  | Clouding of system at | Clouding disappears on reheating to RT |
| Polyester 1 | 7° C. | yes |
| Polyester 2 | 9° C. | yes |
| Reference polyester 3 | 13° C. | no |
| Reference polyester 4 | 6° C. | yes |
| Polyester 5 | 9° C. | yes |
| Polyester 6 | 8° C. | yes |
| Reference polyester 7 | 20° C. | no |
| Reference polyester 8 | 14° C. | no |
| Polyester 9 | 5° C. | yes |
| Polyester 10 | 4° C. | yes |
| Polyester 11 | 11° C. | no |

|  | System 4 | |
|---|---|---|
|  | Clouding of system at | Clouding disappears on reheating to RT |
| Polyester 1 | 9° C. | yes |
| Polyester 2 | 6° C. | yes |
| Reference polyester 3 | 14° C. | no |
| Reference polyester 4 | 8° C. | yes |
| Polyester 5 | 8° C. | yes |
| Polyester 6 | 8° C. | yes |
| Reference polyester 7 | 20° C. | no |
| Reference polyester 8 | 17° C. | no |

Longitudinal watertightness was checked on the following system, the quantitative data being based on parts by weight:

|  | System 5 |
|---|---|
| Polyol component |  |
| Polyol F | 40.8 |
| Polyol G | 20.0 |
| Polyol I | 30.0 |
| Polyester | 1.0 |
| 1,4-Butanediol | 7.0 |
| Water | 0.1 |
| Bis(2-dimethylaminoethyl) ether | 0.1 |
| 1,4-Diazabicyclo[2.2.2]octane | 1.0 |
| Iso component |  |
| Isocyanate B | 100 |
| MR 100: | 41 |

The polyesters used here comprised polyesters 1, 2, 5, and 6, and reference polyester 8. Polyesters 1, 2, 5, and 6 passed the test. Polyester 8 did not pass the test, because moisture could be detected on the side opposite to the water column.

The invention claimed is:

1. A composite element, comprising
   (i) plastic, adhering to which there is
   (ii) a polyisocyanate polyaddition product, obtained by a process comprising mixing
   component A comprising isocyanate and optionally a catalyst
   with
   component B comprising a compound having a group reactive toward isocyanate, a catalyst, optionally a blowing agent, and optionally a further additive, to obtain a reaction mixture, and permitting the reaction mixture to complete its reaction to give the polyisocyanate polyaddition product,
   wherein the polyisocyanate polyaddition product is obtained by a process that does not comprise forming a polyisocyanate prepolymer,
   the compound having a group reactive toward isocyanate comprises a polyester polyalcohol as an adhesion promoter,
   the polyester polyalcohol is produced by polycondensation of an acid component with at least one low-molecular-weight diol whose molar mass is less than 500 g/mol, in excess, such that the acid component comprises from 83 to 97 mol % of adipic acid and from 3 to 17 mol % of phthalic acid, isophthalic acid, terephthalic acid, or a combination thereof, and
   the polyester polyalcohol is not crystallized or flocculated.

2. The composite element according to claim 1, wherein the acid component comprises no further di- or polybasic carboxylic acids other than adipic acid and phthalic acid, isophthalic acid, terephthalic acid, or a combination thereof.

3. The composite element according to claim 1, wherein the acid component comprises adipic acid and isophthalic acid.

4. The composite element according to claim 1, wherein the low-molecular-weight diol is monoethylene glycol, 1,3-propanediol, 1,4-butanediol, 1,5-pentanediol, or 1,6-hexanediol.

5. The composite element according to claim 1, wherein a hydroxy number of the adhesion promoter is from 40 to 100.

6. The composite element according to claim 1, wherein a proportion of the adhesion promoter is from 0.5 to 10% by weight, based on a total weight of the compound b) having a group reactive toward isocyanate.

7. The composite element according to claim 1, wherein the polyisocyanate polyaddition product (ii) is a compact polyurethane, a flexible polyurethane foam, a semirigid polyurethane foam, or an integral foam.

8. The composite element according to claim 1, wherein the plastic (i) is a thermoplastic.

9. The composite element according to claim 1, wherein the plastic (i) is insulation for an electrical conductor.

10. A component comprising the composite element according to claim 1, wherein the component is suitable in the fitting out of an aircraft, a vehicle, or of a building.

11. The component according to claim 10, which is sheathing of an electrical conductor.

12. The composite element according to claim 1, wherein component A comprises a catalyst.

13. The composite element according to claim 12, wherein the catalyst is a tertiary amine and/or organometallic compound.

14. The composite element according to claim 1, wherein component B comprises a blowing agent.

15. The composite element of claim 1, wherein peeling of the polyisocyanate polyaddition product from the plastic, at 24 hours after the reaction mixture completes its reaction, results in cohesive fracture of the polyisocyanate polyaddition product, and does not result in adhesive fracture of the polyisocyanate polyaddition product.

16. The composite element of claim 1, wherein component B is configured to be stored at temperatures as low as 13° C. without crystallization and without being below a pour point thereof.

17. A composite element, comprising
(i) plastic, adhering to which there is
(ii) a polyisocyanate polyaddition product, obtained by a process comprising mixing
component A comprising isocyanate and optionally a catalyst
with
component B comprising a compound having a group reactive toward isocyanate, a catalyst, optionally a blowing agent, and optionally a further additive,
to obtain a reaction mixture, and permitting the reaction mixture to complete its reaction to give the polyisocyanate polyaddition product,
wherein the polyisocyanate polyaddition product is obtained by a process that does not comprise forming a polyisocyanate prepolymer,
the compound having a group reactive toward isocyanate comprises a polyester polyalcohol as an adhesion promoter,
the polyester polyalcohol is produced by polycondensation of an acid component with at least one low-molecular-weight diol whose molar mass is less than 500 g/mol, in excess, such that the low-molecular-weight diol comprises from 5 to 66 mol % of 1,3-propanediol, based on a total amount of the at least one low-molecular weight diol, and
the polyester polyalcohol is not crystallized or flocculated.

18. The composite element according to claim 17, wherein the acid component comprises at least 90% by weight of adipic acid.

19. The composite element according to claim 17, wherein the low-molecular-weight diol further comprises at least one further diol selected from the group consisting of monoethylene glycol, 1,4 butanediol, 1,5-pentanediol, and 1,6-hexanediol.

20. The composite element of claim 17, wherein peeling of the polyisocyanate polyaddition product from the plastic, at 24 hours after the reaction mixture completes its reaction, results in cohesive fracture of the polyisocyanate polyaddition product, and does not result in adhesive fracture of the polyisocyanate polyaddition product.

21. The composite element of claim 17, wherein component B is configured to be stored at temperatures as low as 13° C. without crystallization and without being below a pour point thereof.

22. A composite element, comprising:
(i) plastic, adhering to which there is
(ii) a polyisocyanate polyaddition product, obtained by a process comprising mixing
component A comprising a polyisocyanate prepolymer and optionally a catalyst
with
component B comprising a compound having a group reactive toward isocyanate, a catalyst, optionally a blowing agent, and optionally a further additive,
to obtain a reaction mixture, and permitting the reaction mixture to complete its reaction to give the polyisocyanate polyaddition product,
wherein the polyisocyanate prepolymer is obtained by a process comprising reacting an excess of polyisocyanate with a polyol,
the polyol reacted to form the polyisocyanate prepolymer has a content of at most 3.0% by weight of polyester, or lacks any polyester,
the compound having a group reactive toward isocyanate comprises a polyester polyalcohol as an adhesion promoter,
the polyester polyalcohol is produced by polycondensation of an acid component with at least one low-molecular-weight diol whose molar mass is less than 500 g/mol, in excess, such that the acid component comprises from 83 to 97 mol % of adipic acid and from 3 to 17 mol % of phthalic acid, isophthalic acid, terephthalic acid, or a combination thereof, and
the polyester polyalcohol is not crystallized or flocculated.

23. The composite element of claim 22, wherein peeling of the polyisocyanate polyaddition product from the plastic, at 24 hours after the reaction mixture completes its reaction, results in cohesive fracture of the polyisocyanate polyaddition product, and does not result in adhesive fracture of the polyisocyanate polyaddition product.

24. The composite element of claim 22, wherein component B is configured to be stored at temperatures as low as 13° C. without crystallization and without being below a pour point thereof.

25. A process for producing the composite element of claim 1, the process comprising adhering a polyisocyanate polyaddition product to a plastic, such that
component A comprising isocyanate and optionally a catalyst
with
component B comprising a compound having a group reactive toward isocyanate, a catalyst, optionally a blowing agent, and optionally a further additive,
to obtain a reaction mixture, and the reaction mixture is permitted to complete its reaction to give the polyisocyanate polyaddition product,
wherein the compound b) having a group reactive toward isocyanate comprises a polyester polyalcohol as an adhesion promoter, said polyester polyalcohol produced by polycondensation of an acid component with at least one low-molecular-weight diol whose molar mass is less than 500 g/mol, in excess, such that the acid component comprises from 83 to 97 mol % of adipic acid and from 3 to 17 mol % of phthalic acid, isophthalic acid, terephthalic acid, or a combination thereof.

26. A process for the producing the composite element of claim 17, the process comprising adhering a polyisocyanate polyaddition product to a plastic, such that
component A comprising isocyanate and optionally a catalyst
with
component B comprising a compound having a group reactive toward isocyanate, a catalyst, optionally a blowing agent, and optionally a further additive,
to obtain a reaction mixture, and the reaction mixture is permitted to complete its reaction to give the polyisocyanate polyaddition product,
wherein the compound b) having a group reactive toward isocyanate comprises a polyester polyalcohol as an adhesion promoter, said polyester polyalcohol produced by polycondensation of an acid component with at least one low-molecular-weight diol whose molar mass is less than 500 g/mol, in excess, such that the low-molecular-weight diol comprises at least 5 to 66 mol % of 1,3-propanediol, based on a total amount of the at least one low-molecular-weight diol.

* * * * *